J. F. CHRONINGER.
PITMAN SPREADER.
APPLICATION FILED MAR. 5, 1914.

1,171,320.

Patented Feb. 8, 1916.

Witnesses
M. A. Jones
B. H. Miller

Inventor,
J. F. Chroninger,
By Frank Fuller
Attorney.

THE COLUMBIA PLANOGRAPH CO., WASHINGTON, D. C.

UNITED STATES PATENT OFFICE.

JERRY F. CHRONINGER, OF DELPHOS, KANSAS.

PITMAN-SPREADER.

1,171,320.  Specification of Letters Patent.  Patented Feb. 8, 1916.

Application filed March 5, 1914. Serial No. 822,607.

*To all whom it may concern:*

Be it known that I, JERRY F. CHRONINGER, a citizen of the United States, residing at Delphos, in the county of Ottawa and State of Kansas, have invented certain new and useful Improvements in Pitman-Spreaders, of which the following is a specification.

My invention relates to an improved driving connection such as afforded by a pitman and sickle head of a mowing machine and to an improved combination tool; the invention aiming to provide an improved driving connection with which coöperates the tool, the latter serving as a wrench, a puller and a pitman spreader.

Figure 1:
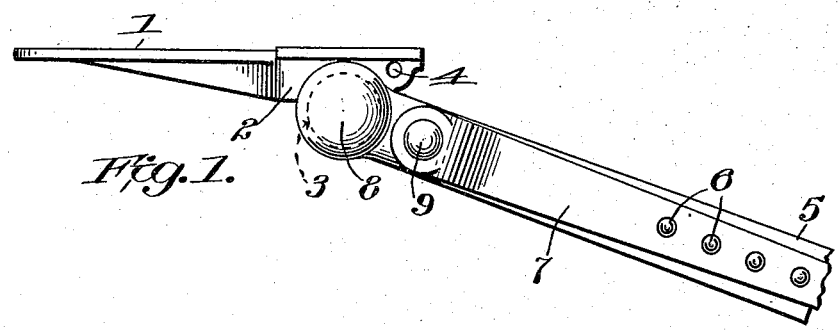
Figure 2:
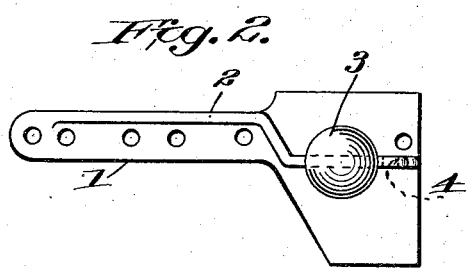
Figure 3:
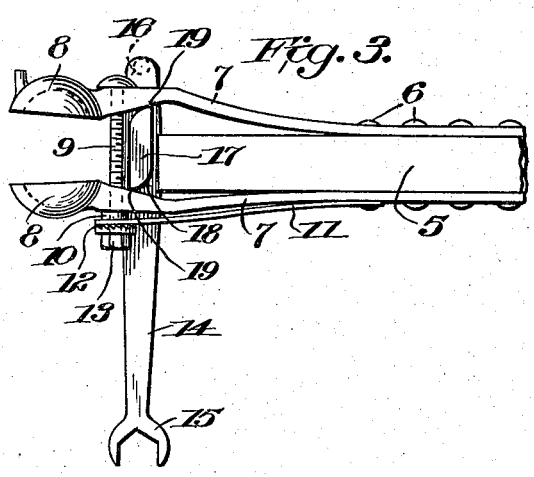
Figure 4:
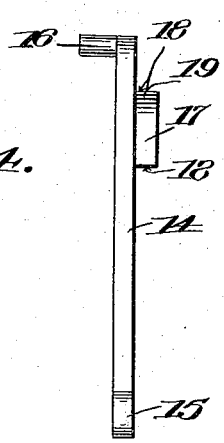
Figure 5:
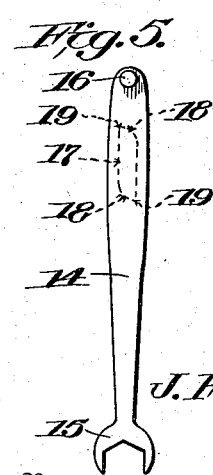

In accompanying drawings illustrating the invention, Figure 1 is a plan view of the parts of the driving connection of a mowing machine; Fig. 2 is a side elevation of the sickle head; Fig. 3 is a side elevation together with the tool shown spreading its clasp arms; Fig. 4 is an edge elevation of the tool; and Fig. 5 is an elevation of the tool at right angles to Fig. 4.

Referring specifically to the drawings, 1 designates a head adapted for rigid attachment to a sickle bar to which is attached a driving pitman later to be described. This head has a strengthening rib 2 with which is formed integrally, a ball 3, beyond which ball the rib is extended on one side and provided with an aperture 4 to facilitate pulling.

With respect to the pitman, the main rod or bar, may be designated 5 and have fastened thereto as by rivets 6, resilient outwardly yieldable socket clasp arms 7 which are provided with socket caps 8 at one end. The caps 8 engage the ball 3 so as to pivotally connect the pitman on the ball as in Fig. 1. Clasps 7 are fastened against springing movement by a bolt 9 extending loosely therethrough having a washer 10 thereon, on the outer face of which rests a leaf spring 11 fastened by one of the rivets 6 to bar 5 with which coöperates ratchet teeth 12 of a nut 13 applied to bolt 9. The tool employed has an elongated body 14 having a wrench head 15 at one end to engage the nut 13. Also on the body 14 is an angle lug 16 adapted to engage the aperture 4, and there is also a spreader member or lug 17 having curved spreading end faces 18 leading to pointed or biting edges 19.

In use, to couple the head and pitman, the arms or clasps 7 are spread by inserting therebetween the lug 17 and then turning the tool so that the faces 18 act against the inner faces of the clasps 7 spreading them apart as in Fig. 3. When spread, due to the resilience of the clasps, the edges 19 effectively bite the clasps and thus prevent return of the tool to first position. When the clasps are spread the ball 3 is received therebetween, whereupon the tool is returned to normal position displacing the spreader and clasping the ball. The arms are secured at the proper adjustment through the tightening of the nut 13. In tightening or loosening the nut the head 15 of the tool engages the same. In removing a sickle with the head 1 thereon, the lug 16 is placed in aperture 4 and the tool used as a puller. It is exceedingly difficult to remove the sickle at the present time but this can be easily done by the use of the puller in connection with the lug.

Changes such as fall within the spirit and scope of the appended claims may be made.

I claim:

1. A tool having an elongated body provided with a spreader lug rigidly mounted on and offset from one face thereof, said lug having its edge at one end curved and leading to a side edge of the lug and forming a biting point thereat for the purpose specified.

2. A tool having an elongated body provided with a spreader lug mounted on and offset from one face thereof, said lug being elongated and disposed longitudinally of the body, said lug having its end edges curved toward opposite edges of the lug and coöperating with said side edges to form diagonal offset biting points as set forth.

In testimony whereof I affix my signature in presence of two witnesses.

JERRY F. CHRONINGER.

Witnesses:
 G. B. RICHARDS,
 J. C. WRIGHT.

Copies of this patent may be obtained for five cents each, by addressing the "Commissioner of Patents, Washington, D. C."